(12) United States Patent
Holmes et al.

(10) Patent No.: US 8,056,211 B2
(45) Date of Patent: Nov. 15, 2011

(54) METHOD OF ASSEMBLING A STATOR FOR AN ELECTRIC MOTOR

(75) Inventors: Alan G. Holmes, Clarkston, MI (US); Richard A. Ordo, Greenwood, IN (US); Ahmed M. El-Antably, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 1008 days.

(21) Appl. No.: 11/953,250

(22) Filed: Dec. 10, 2007

(65) Prior Publication Data

US 2008/0086868 A1 Apr. 17, 2008

Related U.S. Application Data

(62) Division of application No. 11/402,541, filed on Apr. 12, 2006, now Pat. No. 7,696,661.

(51) Int. Cl.
*H02K 15/00* (2006.01)
(52) U.S. Cl. ............. 29/596; 29/592.1; 29/597; 310/89; 310/91
(58) Field of Classification Search .................. 29/592.1, 29/596, 597; 310/89, 91, 254.1
See application file for complete search history.

(56) References Cited

U.S. PATENT DOCUMENTS 3,916,233 A * 10/1975 Vockler ........................... 310/89
6,373,163 B1 * 4/2002 Oohashi et al. ............... 310/198

FOREIGN PATENT DOCUMENTS

DE 29813023 U1 11/1999
WO 2005020410 A2 3/2005

* cited by examiner

*Primary Examiner* — Carl Arbes
(74) *Attorney, Agent, or Firm* — Quinn Law Group, PLLC

(57) ABSTRACT

The apparatus of the present invention provides a stator for an electric motor. The apparatus includes a plurality of stator components assembled together to form a generally annular stator core. A wire is wrapped around at least a portion of the stator core to form a stator winding. A first generally annular end plate and a second generally annular end plate are mounted to axially opposite sides of the stator core such that the stator core is axially trapped and retained therebetween. A fastener applies a clamping load to the first and second end plates such that the stator core is compressed therebetween. The clamping load from the fastener is applied directly to the first and second end plates which distribute the clamping load to the stator core such that the plurality of components are held together without the fastener directly applying the clamping load to the stator core. A corresponding method for providing a stator is similarly provided.

5 Claims, 3 Drawing Sheets

US 8,056,211 B2

METHOD OF ASSEMBLING A STATOR FOR AN ELECTRIC MOTOR

CROSS-REFERENCE TO RELATED APPLICATIONS

This application is a divisional of U.S. patent application Ser. No. 11/402,541, filed Apr. 12, 2006, which is hereby incorporated by reference in its entirety.

TECHNICAL FIELD

The present invention pertains generally to a method and apparatus for assembling a stator of an electric motor.

BACKGROUND OF THE INVENTION

It is known to construct an electric motor using three or more concentrated windings wherein one or more of the windings are provided for each of three electrical phases. These windings can distribute magnetic flux to multiple poles of the stator in the electric motor. Such a motor is three-dimensional, in that the magnetic flux passing through the concentrated winding is conducted both around the circumference and along the axis of the motor in the stator.

Manufacturing and assembling a three-phase electric motor includes producing a plurality of motor components having relatively complex geometries, and performing additional processing steps such as, for example, winding the stator wire around the stator core teeth in a predefined pattern. In an effort to reduce manufacturing costs, a plurality of component segments may be pre-formed and assembled together to produce the motor.

SUMMARY OF THE INVENTION

The apparatus of the present invention includes a plurality of stator components composed of generally insulated ferromagnetic particles. The stator components are assembled together to form a generally annular stator core. A wire is wrapped around at least a portion of the stator core to form a stator winding. A first generally annular end plate and a second generally annular end plate are mounted to axially opposite sides of the stator core such that the stator core is axially trapped and retained therebetween. A fastener applies a clamping load to the first and second end plates such that the stator core is compressed therebetween. The clamping load from the fastener is applied directly to the first and second end plates which distribute the clamping load to the stator core such that the plurality of components are held together without the fastener directly applying the clamping load to the stator core.

The plurality of stator components include a plurality of protrusions and depressions adapted to facilitate the alignment of the stator components as they are assembled to form the stator core.

The first and second end plates include a plurality of protrusions and/or depressions adapted to facilitate the alignment of the first and second end plates relative to the stator core.

The apparatus of the present invention includes a first annular member disposed between the first end plate and the stator core, and a second annular member disposed between the second end plate and the stator core, wherein the first and second annular members are configured to more evenly distribute the clamping load from the fastener to the stator core.

The apparatus of the present invention includes an adhesive disposed between the first end plate and the stator core, and between the second end plate and the stator core, wherein the adhesive is configured to hold the plurality of components together with a reduced fastener clamping load.

The method of the present invention includes assembling the plurality of stator components such that at least some of the alignment protrusions and the alignment depressions engage to align the stator components and form a stator core. A wire is wrapped around at least a portion of the stator core to form a stator winding. The first and second end plates are mounted to axially opposite sides of the stator core such that the stator core is axially trapped and retained therebetween. A clamping load is applied to the first and second end plates with a fastener such that the stator core is compressed therebetween. The clamping load from the fastener is applied directly to the first and second end plates which distribute the clamping load to the stator core such that the plurality of components are held together without the fastener directly applying the clamping load to the stator core.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
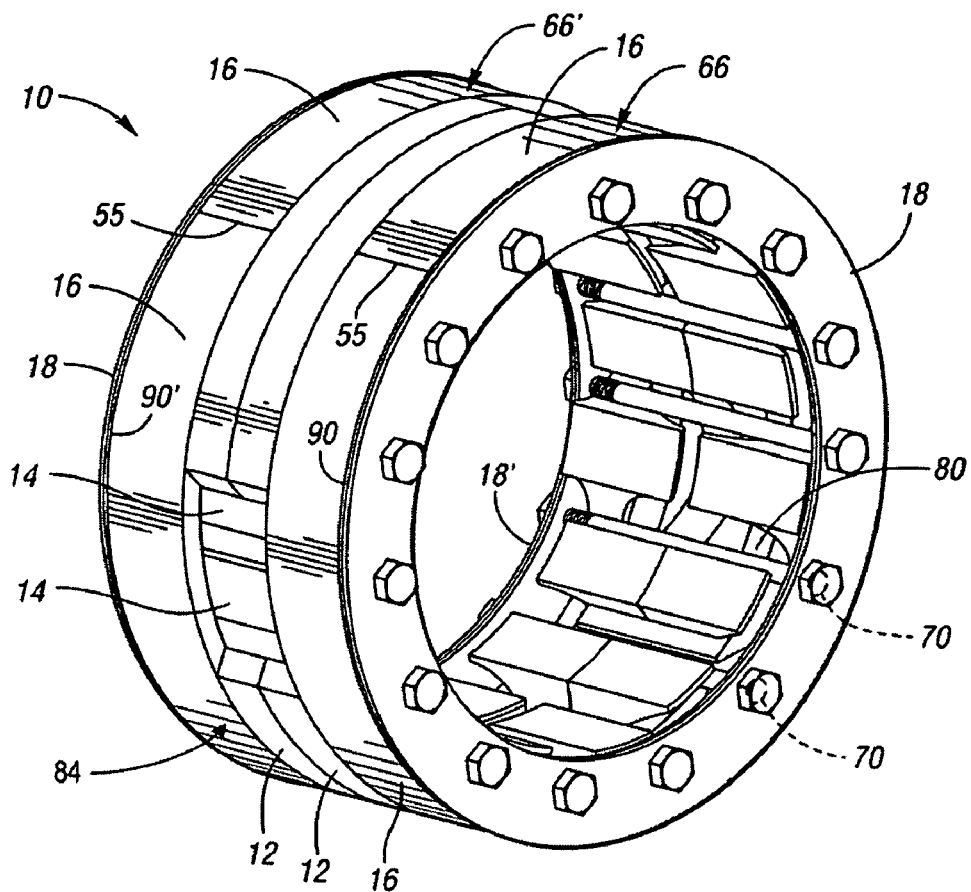
FIG. 1 is a perspective view of a stator assembly in accordance with the present invention.

Referring to the drawings, wherein like reference numbers refer to like components, FIG. 1 shows a perspective view of a stator assembly 10 for an electric motor (not shown). In an effort to reduce manufacturing costs, the stator assembly 10 includes a plurality of component segments that are assembled together to produce the motor. More precisely, the stator assembly 10 includes a plurality of center segments 12 (i.e., six identical center segments which are attached together), at least one coil winding 14, a plurality of end segments 16 (i.e., six identical end segments which are attached together), a plurality of end plates 18, and at least one fastener such as the bolts or bars 80. The center segments 12 and the end segments 16 are composed of pressure shaped ferromagnetic particles that are generally coated and insulated to provide low electrical conductivity. According to a preferred embodiment, the ferromagnetic particles are a powdered metal composition which is pressed to form the shapes of the center segments 12 and the end segments 16.

Figure 2:
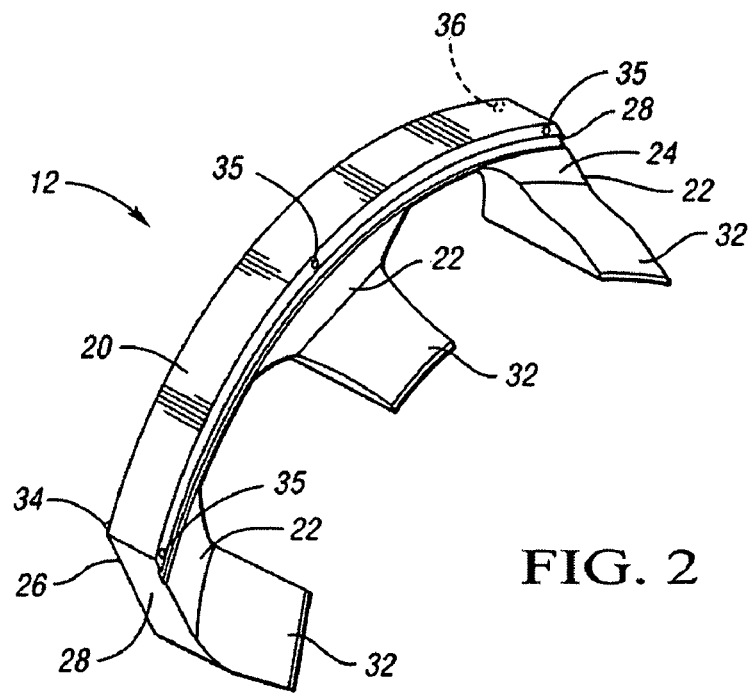
FIG. 2 is a perspective view of a center segment of the stator assembly of FIG. 1.

Referring to FIG. 2, a center segment 12 is shown in more detail. The center segment 12 defines a front surface 24, a back surface 26 opposite the front surface 24, and opposing end portions 28. The center segment 12 also defines a radially outer shell portion 20 and a plurality of teeth 22 extending therefrom. The teeth 22 each extend radially inward from the shell portion 20 and terminate in a flanged end portion 32. The center segment 12 includes a plurality alignment features such as, for example, the alignment protrusions 34, the alignment depressions 35 and/or the alignment depressions 36. To facilitate alignment, the protrusions 34 and the depressions 36 are preferably generally conical so as to allow for a margin of error during initial engagement and thereafter self-center to precisely align components during assembly; however, alternate alignment feature configurations may be envisioned. According to a preferred embodiment, the back surface 26 includes one alignment protrusion 34 and one alignment depression 36 and the front surface 24 includes three alignment depressions 35.

Figure 3:
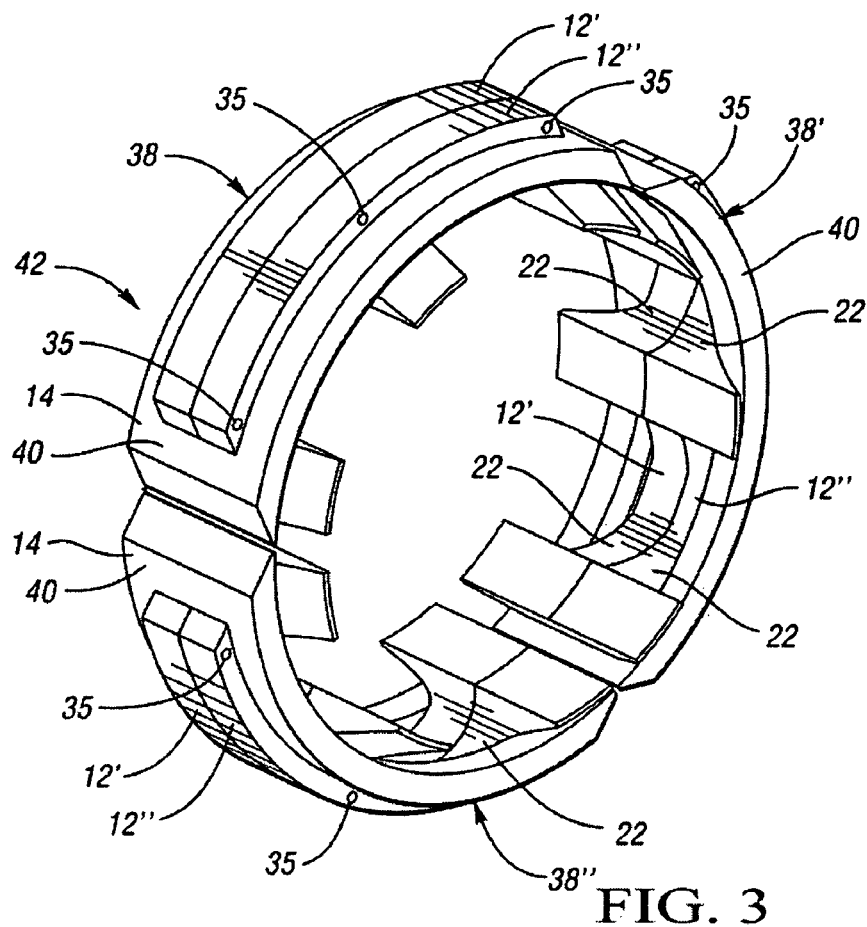
FIG. 3 is a perspective view of a sub-assembly of the stator assembly of FIG. 1.

As shown in FIG. 3, two center segments 12 placed back-to-back (i.e., 26 to 26), and a coil winding 14 are assembled together to form a sub-assembly such as the sub-assembly 38, and thereafter three sub-assemblies 38, 38' and 38" are assembled together to form a generally annular sub-assembly 42 as will be described in detail hereinafter.

The sub-assemblies 38, 38' and 38" each include two center segments 12 such as the center segments 12' and 12" that are assembled together and have multiple layers of wire 40 (shown schematically in FIG. 3) wound therearound. The wire 40 wound about the respective center segments 12' and 12" in the manner described hereinafter defines a coil winding 14 for each respective sub assembly 38, 38' and 38". The two center segments 12' and 12" are assembled by placing them back-to-back such that their respective back surfaces 26 (shown in FIG. 2) engage each other. As the back surfaces 26 of the respective center segments 12 and 12" are brought together, the alignment protrusion 34 (shown in FIG. 2) of the center segment 12' is insertable into an alignment depression 36 (shown in FIG. 2) on the back of the center segment 12", and the alignment protrusion 34 of the center segment 12" is insertable into the alignment depression 36 on the back of the center segment 12' such that the center segments 12' and 12" are aligned with each other. Thereafter, the wire 40 is wrapped around the teeth 22 of the center segments 12' and 12" radially outwardly of the respective flanged end portions 32 thereby forming a coil winding 14 and completing each respective sub-assembly 38, 38' and 38". Each coil winding 14 is schematically shown as being generally rectangular; however, it should be appreciated that each winding 14 is actually composed of individual strands of wire 40 wrapped around the teeth 22 multiple times. Three sub-assemblies 38, 38' and 38" are positioned such that their respective end portions 28 (shown in FIG. 2) engage or abut each other to form the generally annular sub-assembly 42.

Figure 4:
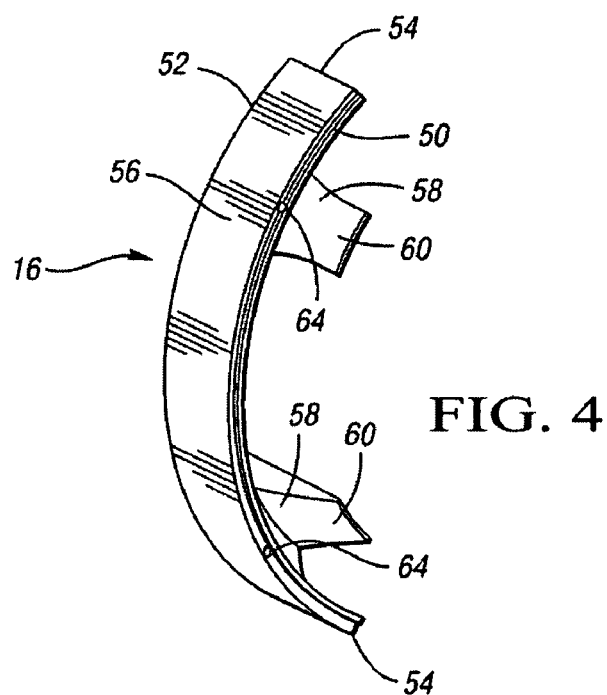
FIG. 4 is a perspective view of an end segment of the stator assembly of FIG. 1.

Referring to FIG. 4, one of the end segments 16 is shown in more detail. The end segment 16 defines an inner surface 50, an outer surface 52 opposite the inner surface 50, and opposing end portions 54. The end segment 16 also defines a radially outer housing portion 56 and a plurality of teeth 58 extending therefrom. The teeth 58 each extend radially inward from the housing portion 56 and terminate in a flanged end portion 60. The end segment 16 includes a plurality of alignment features such as the alignment protrusions 64. According to a preferred embodiment the inner surface 50 of each end segment 16 includes two alignment protrusions 64 adapted to engage complimentary alignment depressions 35 of the sub-assembly 42 such that the end segment 16 is aligned relative thereto. Additionally, the outer surface 52 of each end segment 16 includes two alignment protrusions 64 for alignment with an end plate 18. Three end segments 16 are positioned, preferably within a fixture, such that their respective end portions 54 engage or abut as at 55 (shown in FIG. 1) to form generally annular end rings 66 and 66' (shown in FIG. 5).

Figure 5:
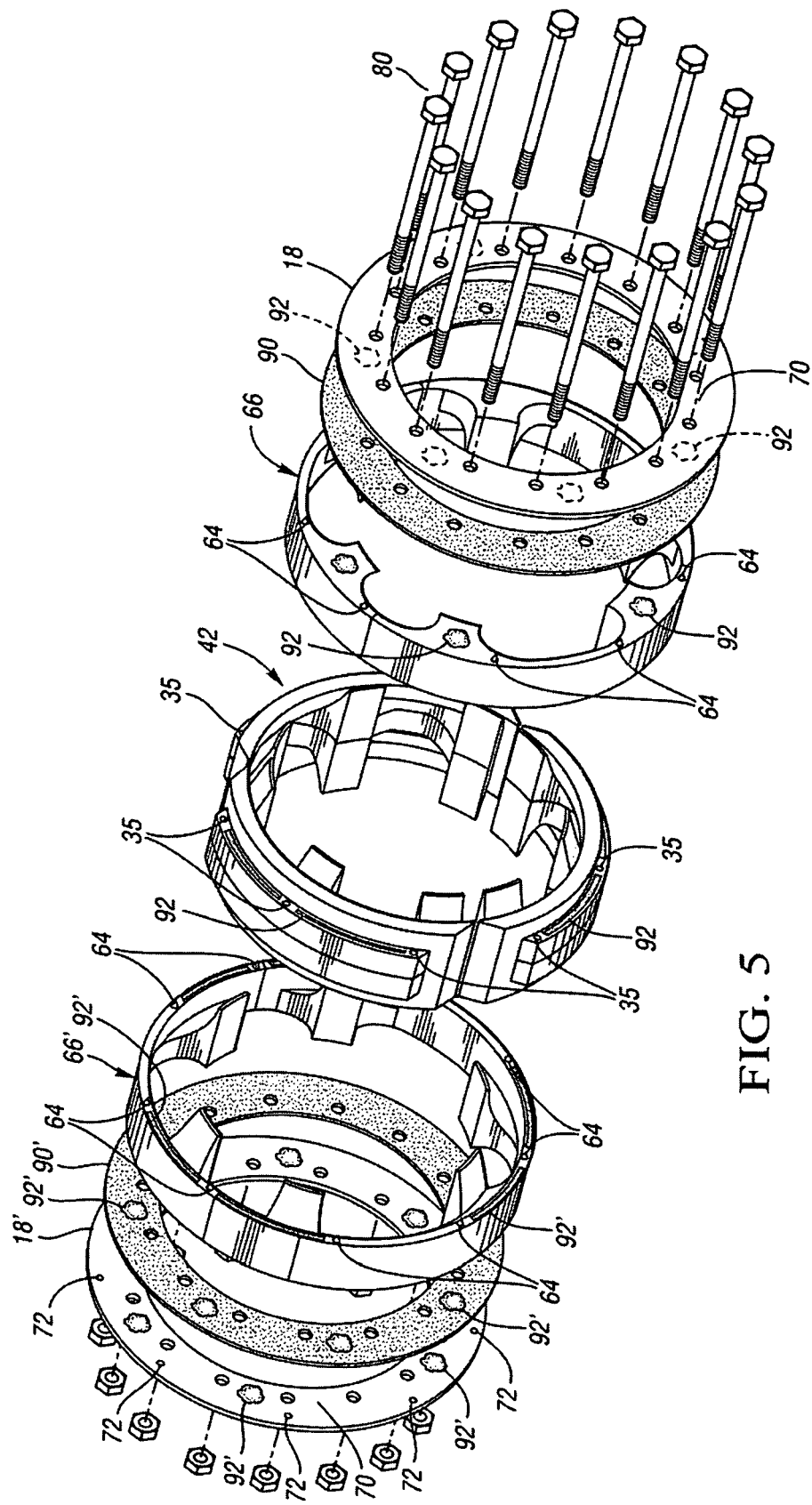
FIG. 5 is an exploded view of the stator assembly of FIG. 1.

Referring to FIG. 5, the annular end plates 18 and 18' are generally O-shaped and each include a plurality of bolt holes 70. The end plates 18, 18' also include a plurality of alignment features such as the alignment depressions 72. The alignment depressions 72 each receive an alignment protrusion 64 from one of the end rings 66 and 66" such that the end plates 18, 18' are respectively aligned relative thereto. The end plates 18, 18' are preferably composed of non-magnetic stainless steel; however, alternate compositions such as fiberglass reinforced plastic may be envisioned.

Having identified the components of the stator assembly 10 hereinabove, the assembly steps will now be described with reference to FIG. 5 showing an exploded view of the stator assembly 10. It should be appreciated that, unless otherwise specified, the assembly steps do not necessarily have to be performed in the order described.

A first end plate 18 is located and retained, preferably in a fixture (not shown). A first end ring 66 composed of three end segments 16 is then mounted to the first end plate 18. As the first end ring 66 is mounted to the first end plate 18, alignment protrusions 64 of the end ring 66 are inserted into complementary alignment depressions 72 of the end plate 18 such that the first end ring 66 is aligned relative to the first end plate 18. The sub-assembly 42 which is assembled in the manner described hereinabove is then mounted to the first end ring 66. As the sub-assembly 42 is mounted to the first end ring 66, alignment protrusions 64 of the end ring 66 are inserted into complementary alignment depressions 35 of the sub-assembly 42 such that the sub-assembly 42 is aligned relative to the first end ring 66. A second end ring 66' composed of three end segments 16 is then mounted to the sub-assembly 42. As the second end ring 66' is mounted to the sub-assembly 42, alignment protrusions 64 of the end ring 66' are inserted into complementary alignment depressions 35 of the sub-assembly 42 such that the second end ring 66' is aligned relative to the sub-assembly 42. A second end plate 18' is then mounted to the second end ring 66'. As the second end plate 18' is mounted to the second end ring 66', alignment protrusions 64 of the second end ring 66' are inserted into complementary alignment depressions 72 of the second end plate 18' such that the second end ring 66' is aligned relative to the second end plate 18'.

After the previously described components of the stator assembly have been aligned and assembled, preferably in a fixture (not shown), the first and second end plates 18 and 18' are held together by a plurality of fasteners such as the bolts or bars 80. The bolts 80 are configured to pass axially through gaps formed between the teeth 22 and the teeth 58 to retain the end plates 18 and 18'. The bolts 80 are preferably composed of a non-magnetic material such as non-magnetic stainless steel or titanium having low electrical conductivity to minimize eddy currents in the bolts 80 caused by leakage flux.

The bolts 80 transmit a substantial clamping force through the end plates 18 and 18' to retain the remaining components of the stator assembly 10. The clamping loads from the bolts 80 are initially transferred to the end plates 18 and 18' which are configured to more uniformly distribute such loads to the end rings 66, 66' and the sub-assembly 42. The end plates 18 and 18' are therefore composed of a stronger material than that of the end rings 66, 66' and the sub-assembly 42 which are preferably composed of powdered metal. Accordingly, the stronger end plates 18 and 18' are adapted to adsorb and distribute the relatively large clamping loads that hold the stator assembly 10 together, and to thereby protect the powdered metal components from such loads.

For purposes of the present invention, the center segments 12 and the end segments 16 which are assembled together in the manner previously described define a generally annular stator core 84. In other words, the stator core 84 includes all the components of the stator assembly 10 except the stator wire 40 and the coil windings 14, the end plates 18, and the bolts 80.

According to a preferred embodiment, a first annular member 90 is disposed between the first end plate 18 and the first end ring 66, and a second annular member 90' is disposed between the second end plate 18' and the second end ring 66'. The annular members 90, 90' are preferably composed of a pliable material such as that typically used for gaskets. The annular members 90, 90' are adapted to prevent load spikes caused by irregularities in the end plates 18, 18' or in the end rings 66, 66', and to more uniformly distribute the loads applied by the bolts 80.

According to another preferred embodiment, adhesive 92 is disposed between the first end plate 18 and the first annular member 90, between the annular member 90 and the first end ring 66, and/or between the first end ring 66 and the sub-assembly 42. Similarly, adhesive 92' is disposed between the sub-assembly 42 and the second end ring 66', between the second end ring 66' and the annular member 90', and/or between the annular member 90' and the end plate 18'. The adhesive 92, 92' acts to hold the stator assembly 10 together and thereby reduces the requisite bolt 80 clamping loads such that the powdered metal components do not become damaged.

While the best modes for carrying out the invention have been described in detail, those familiar with the art to which this invention relates will recognize various alternative designs and embodiments for practicing the invention within the scope of the appended claims.

We claim:

1. A method for assembling a stator for an electric motor comprising:
   providing a plurality of stator components composed of generally insulated ferromagnetic particles, said plurality of stator components including a plurality of alignment protrusions and a plurality of alignment depressions;
   assembling said plurality of stator components such that at least a portion of said alignment protrusions and said alignment depressions engage to align said plurality of stator components and form a stator core;
   wrapping a wire around at least a portion of the stator core to form a stator winding;
   providing a first generally annular end plate and a second generally annular end plate;
   mounting said first and second end plates to axially opposite sides of said stator core such that said stator core is axially trapped and retained therebetween;
   applying a clamping load to the first and second end plates with a fastener such that the stator core is compressed therebetween;
   wherein said clamping load from said fastener is applied to said first and second end plates which distribute the clamping load to the stator core such that the plurality of components are held together without said fastener directly applying the clamping load to the stator core.

2. The method of claim 1, wherein said providing a first and second generally annular end plate includes providing a first and second generally annular end plate having a plurality of projections and/or depressions configured to facilitate the alignment of the first and second end plates relative to the stator core.

3. The method of claim 2, further comprising providing a first annular member disposed between the first end plate and the stator core, and a second annular member disposed between the second end plate and the stator core, wherein said first and second annular members are configured to distribute the clamping load from the fastener to the stator core.

4. The method of claim 2, further comprising providing an adhesive disposed between the first end plate and the stator core, and between the second end plate and the stator core, wherein said adhesive is configured to hold the plurality of components together with a reduced fastener clamping load.

5. The method of claim 2, wherein said providing a plurality of stator components includes providing a plurality of center segments and a plurality of end segments.

* * * * *